Figure 1:
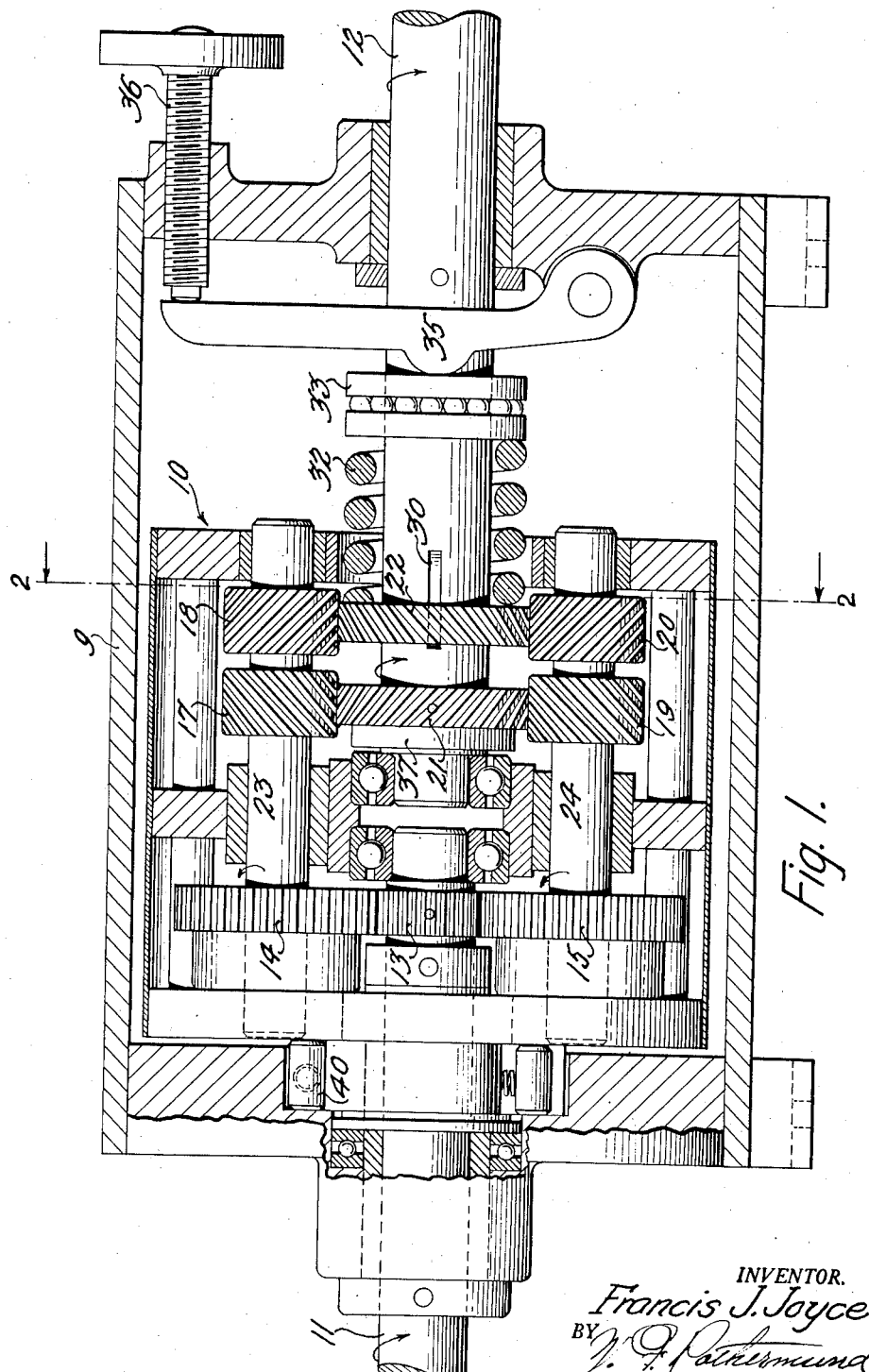

Aug. 4, 1942.   F. J. JOYCE   2,292,079
TORQUE CONVERTER
Filed June 17, 1941   2 Sheets-Sheet 1

INVENTOR.
Francis J. Joyce
BY
ATTORNEY

Aug. 4, 1942. F. J. JOYCE 2,292,079
TORQUE CONVERTER
Filed June 17, 1941 2 Sheets-Sheet 2
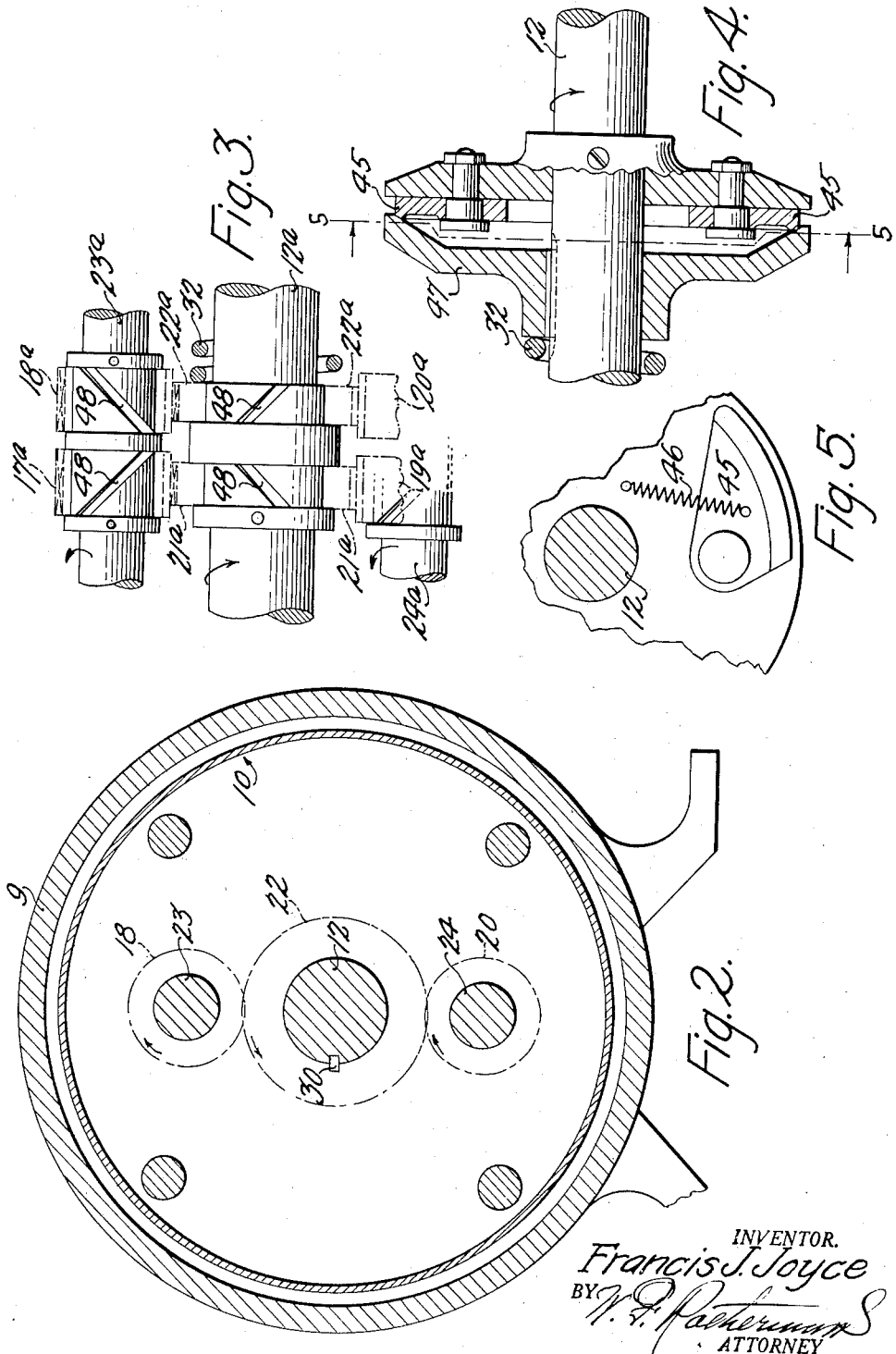

Patented Aug. 4, 1942

2,292,079

UNITED STATES PATENT OFFICE 2,292,079

TORQUE CONVERTER

Francis J. Joyce, Keyport, N. J., assignor of one-half to Francis J. Joyce, Jr., Keyport, N. J.

Application June 17, 1941, Serial No. 398,393

8 Claims. (Cl. 74—259)

This invention which constitutes a torque converter, relates in general to power transmission and more particularly to such transmissions as are adapted to automatically vary the driving ratio between the driving and driven members to a point providing the highest driving efficiency.

The invention as herein disclosed is especially suited for application to motor vehicles and other industrial purposes and comprises a positive drive means mechanically controlled in an automatic manner by the amount of load encountered which accordingly controls the driving ratio of the mechanism.

A feature of the invention is a driving mechanism that is actuated over an infinite speed ratio by the angular pressure of a plurality of spirally cut elements against one another in a manner as to yieldingly restrain the rotation of a number of planet pinions to a greater or lesser degree dependent upon the amount of torque transmitted. This angular pressure is controlled by a novel means that is responsive to speed variations.

An object of the invention is to provide a simple and compact mechanism for the purpose set forth that is composed of only a few elements, thus obviously reducing the cost of manufacture and also the tendency towards non-functioning of the device from failure of the parts.

Various objects and advantages of the invention will be in part obvious from an inspection of the accompanying drawings and a careful consideration of the particular description and claims of one form of mechanism embodying my invention as hereinafter set forth.

In the drawings:

Figure 1 is a longitudinal section of the present invention in side elevation. Figure 2 is a cross section taken on the line 2—2 of Fig. 1. Figure 3 is a fragmentary side elevation of an alternative construction in which gears other than the spiral type are employed. Figure 4 is a longitudinal section of a centrifugally operated pressure device to actuate the axially movable gear. Figure 5 is a fragmentary cross section taken on the line 5—5 of Fig. 4.

With reference to the drawings, 9 designates a stationary casing in which is rotatably mounted a gear and pinion carrier 10, a drive shaft 11 and a driven shaft 12 said shafts being preferably arranged in axial alignment but not directly connected. The shafts are however drivably connected in the following manner:

A relatively small spur gear 13 secured to the drive shaft 11 meshes with the planet gear 14, 15 which are respectively secured to the lay shafts 23, 24 rotatably mounted in the gear carrier 10.

To each of these lay shafts 23, 24 there is secured a pair of spiral pinions 17, 18 and 19, 20 respectively. The pinions 17, 19 mesh with a companion gear 21 secured to the driven shaft and the pinions 18, 20 with a similar gear 22 secured to the driven shaft in a manner as to permit limited axial displacement by means of a keyway connection 30. A spring 32 of substantial proportions bears against the axially movable gear 22. Variations in the spring setting may be accomplished by means of the hand screw 36 which actuates the pivoted lever 35 against an anti-friction bearing 33 having contact with said spring.

When the torque load is greater at any time than that provided for by the spring setting the mechanism will be at its lowest ratio. When the torque load is lightened, and since the spring load remains constant, the spring will transfer a pressure load upon the axially movable gear 22 equivalent to the difference between the torque load on the driven shaft 12 and the spring setting.

The axial displacement of the gear 22 is limited to the amount of clearance between said gear and its meshing pinion at the pitch circle. In other words, the amount of back-lash. The adjacent gear 21 and its associated pinions 17, 19 act as a synchronizing lock or control means.

Attention is directed to the fact that the spiral pinions which are arranged in pairs on each of the lay shafts 23, 24 are of opposed right and left angularity respectively. This condition also applies to the gears 21, 22 the purpose of which is to direct the axial thrust of said gears in opposite directions, namely, the gear 21 in the direction of the collar 37 and the gear 22 against the spring means 32. With reference to all of the spiral gears mentioned in the present disclosure it is suggested that they preferably be of the 45 degree angle type since that particular angularity is considered the most efficient for the purpose intended. This suggestion is based upon the premise that spiral gears cut at a 45 degree angle will develop an axial thrust under load equal to the rotational effort developed. It should be understood however that the operation of the device is not exclusively dependent upon that particular angularity, but it is considered that the characteristic of the 45 degree angularity has certain advantages that make it the best suited for the purpose intended in the present instance.

With reference to Fig. 1 there is shown a conventional overrunning brake 40 which permits forward rotation of the carrier 10 exclusively. This is for the purpose of preventing any backward creep of said carrier when the planetary drive goes into effect.

With reference to Figs. 4 and 5 there is shown a centrifugally operated pressure means that may be employed as an alternative to the lever 35 and screw 36 and which automatically becomes effective upon the axially movable gear 22 at a certain speed of rotation, said means comprising a pair of weights 45 each restrained by a spring 46 and adapted to cause the member 47 to move longitudinally of the driven shaft 12 against the spring 32.

With reference to Fig. 3 there is shown an alternative method of construction as related to the spiral gear disclosure of Fig. 1. In this particular instance I have employed spur gears 17a, 18a, 19a, 20a, 21a and 22a in place of the spiral gears and pinions previously described. The said spur gears are mounted upon the shafts 12a, 23a and 24a by means of a broached hub conforming with one or more spiral grooves 48 cut in the shafts.

The terms "gears" and "pinions" referred to in the foregoing are employed merely for descriptive purposes and it is not intended to specify any particular pitch diameter thereby.

The operation of the device is as follows:

When the shaft 11 is operated by the prime mover (not shown), driving force is transmitted through the gears 13, 14 and 15 to the lay shafts 23, 24, to spiral pinions 17, 18 and 19, 20 and thence through the spiral gears 21, 20 to the driven shaft 12.

Assuming that the driven shaft 12 is to carry a 1000 pound torque load it will be necessary to impart an equivalent or even greater operating force to the shaft 11. When this force is transmitted through the gears as stated, the carrier 10 will tend to planetize backwards said tendency being checked however by the overrunning brake 40. During this period all of the said gears will be rotating on their respective axes.

Due to the angular character of the spiral pinions 18, 20 and the gear 22, end thrust will develop which is effective upon the gear 22 causing it to slide upon the shaft 12 in a right hand direction the movement being limited by the keyway connection 30 inasmuch as said keyway is parallel to the axis of the shaft and will not permit the gear 22 to rotate angularly thereon, thus the shaft will be rotated by the force thus applied through the gear 22.

The pinions 17, 19 and the gear 21 which are similarly mounted to those above mentioned with the exception that the gear 21 is not slidable on the shaft, contrastingly however, they are of opposite angularity and consequently thereof they exert their thrust in opposite directions which results in centralizing all thrust pressures similar to that characteristic of herringbone gears.

A further purpose of the train 17, 19, and 21 is to prevent the shaft 12 from forcing the gear 22 out of mesh when an interrupted loading occurs or when coasting, said coasting being present when the shaft 12 speeds up in excess of the drive shaft 11 due to momentum. Accordingly, the train 17, 19 and 21 acts as a synchronizing lock which centralizes end pressures on the shafts 23, 24.

The function of the spring 32 is to control the thrust pressure set up on the gear 22 due to load on the shaft 12. The spring pressure should be regulated to meet whatever maximum load is expected on the driven shaft 12. When this load setting is met by the assumed 1000 pounds or more on the shaft 12, the brake 40 comes into play and the gearing then is functioning at its greatest ratio while the carrier 10 remains stationary. As the torque load is lightened, planetization of the carrier takes place due to the difference between the constant spring load and the now present lighter torque load on the shaft 12 this difference of load being exerted on the pinions 18, 20 through the slidable gear 22 causing a restriction of the lay shafts 23, 24.

As the load on the shaft 12 diminishes, the constant pressure of the spring exerts more and more of its relative force on the pinions 18, 20 through angular contact with the gear 22, until the lay shafts are fully restrained from rotation. At this point planetization ceases and the drive and driven shafts 11 and 12 with the carrier 10 are rotating at the same speed or at 1 to 1 ratio.

It will be readily understood that as the torque load on the driven shaft increases or decreases the mechanism will change its ratio automatically to best meet the requirements.

Having thus described my invention, I claim:

1. In a variable torque converter, the combination of a driving member, a driven member, a driving connection therebetween comprising a plurality of spiral driving elements having right and left hand characteristics respectively and adapted to develop an axial thrust in opposite directions substantially equal to the rotational effort involved, a further plurality of spiral elements having connection with the driven member and in mesh with the first said elements; one of the last said elements being adapted for limited axial displacement, and a yieldable power means opposing said displacement.

2. In a variable ratio transmission, the combination of a driving member, a driven member, a driving connection therebetween comprising a plurality of lay shafts each provided with a right and a left hand spiral pinion adapted to generate axial thrust in opposite directions substantially equal to the rotational effort involved, intermediate spiral gears driven from said pinions and drivably secured to the driven member; one of said gears being adapted for limited axial displacement on said driven member by said axial thrust, and a yieldable power element opposing said thrust.

3. In a variable ratio torque converter, the combination of a driving member, a driven member, a driving connection therebetween comprising a pair of rotatable elements having right and left hand spiral driving characteristics of both a rotatable nature and an axial thrust in substantially equal proportions, a further pair of rotatable elements driven therefrom and responsive to said thrust, and a yieldable power element opposing said thrust.

4. In a variable ratio torque converter, the combination of a driving member, a driven member, an automatically changing load controlled driving connection therebetween comprising a plurality of opposed spiral driving elements adapted for both rotational effort and axial thrust in substantially equal proportions the thrust in any one pair of similar elements being in opposite directions, and a yieldable pressure means opposing said thrust in a manner as to control the speed of the driven member.

5. In apparatus of the class described, the combination of a driving member, a driven member, a planetary gear drive therebetween comprising at least one lay shaft, a pair of pinions on the shaft having relatively opposed direction of driving spiral, a pair of spiral gears on said driven member in mesh with said pinions respectively, one of said gears being fast on said shaft and the other being adapted for limited axial displacement, and a yieldable pressure means to control gear thrust pressures.

6. In apparatus of the class described, the combination of a driving and a driven member, a gear drive therebetween comprising a pair of gears on the driven member one of which has limited axial movement on the shaft, a calibrated load spring to oppose said movement, parallel lay shafts driven from the drive member, pinions on said lay shafts in mesh with said gears; all of said gears and pinions having spiral driving characteristics substantially equal in thrust and rotational effort.

7. In a torque converter, the combination with a co-axial driving and driven member, of a planetary driving mechanism therebetween comprising a pair of parallel lay shafts, a pair of spiral pinions on each lay shaft of right and left hand direction of spiral respectively, a pair of spiral gears on the driven member in mesh with said pinions, and a thrust responsive drive connection between one of said gears and the driven member, and a thrust opposing calibrated spring means to control the thrust.

8. In apparatus of the class described, in combination, a driving and a driven shaft, a variable ratio driving connection therebetween comprising at least one lay shaft, toothed rotational driving elements on the lay and driven shafts, one of said elements on the driven shaft being adapted for limited axial movement relatively thereto, right and left hand spiral driving means on both the lay and the driven shafts adapted to impress both axial thrust and rotation in substantially equal proportions upon said toothed driving elements, and a calibrated pressure means opposing the said limited axial movement of the element on the driven shaft.

FRANCIS J. JOYCE.